Feb. 27, 1962  F. J. KESTER  3,023,306
ILLUMINATING ATTACHMENT FOR DENTAL HANDPIECES
Filed Feb. 16, 1959
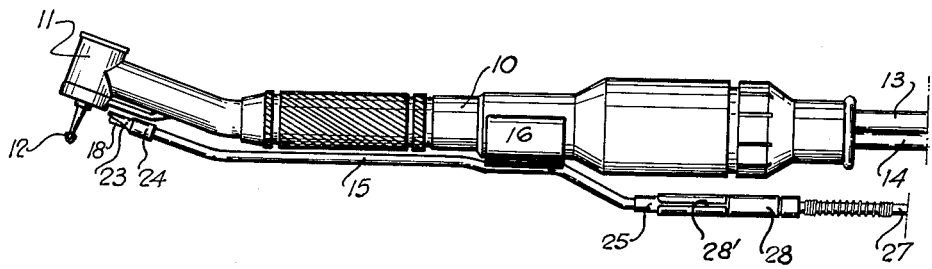
FIG. 1
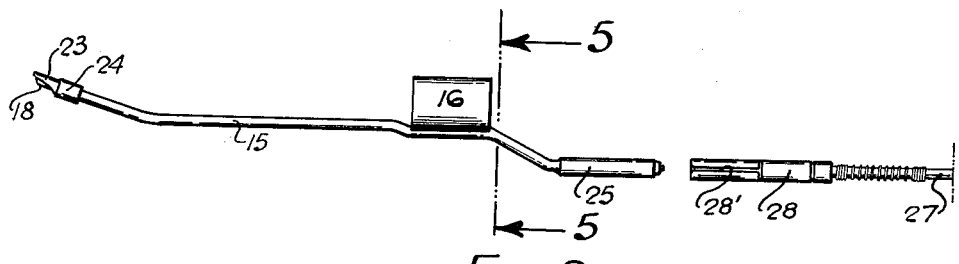
FIG. 2
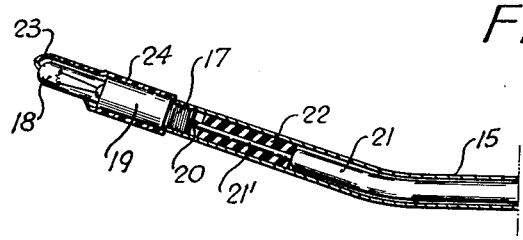
FIG. 3
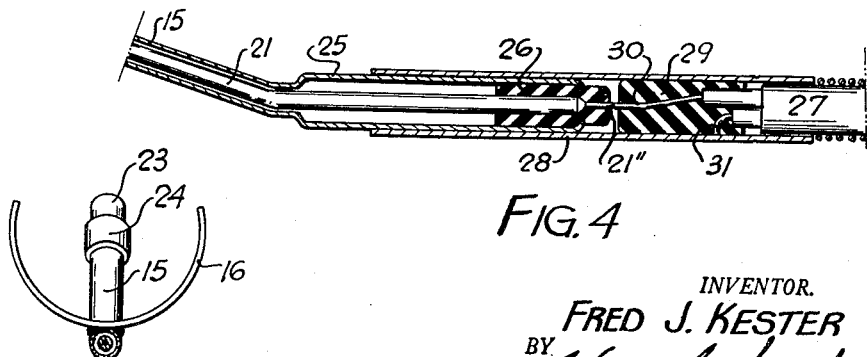
FIG. 4
FIG. 5
INVENTOR.
FRED J. KESTER
BY
ATTORNEY.

United States Patent Office 3,023,306
Patented Feb. 27, 1962

3,023,306
ILLUMINATING ATTACHMENT FOR DENTAL
HANDPIECES
Fred J. Kester, Denver, Colo., assignor to Densco, Incorporated, Denver, Colo., a corporation of Colorado
Filed Feb. 16, 1959, Ser. No. 793,360
1 Claim. (Cl. 240—2)

This invention relates to the art and practice of dentistry, and more particularly to the tools and facilities appurtenant thereto, and has as an object to provide novel and practical means for efficient illumination of the operating environment of a dental instrument in customary powered association with a conventional dental handpiece.

A further object of the invention is to provide a novel and practical means effective in association with a conventional dental handpiece to directly and locally illuminate the operating environment of an instrument powered by the handpiece.

A further object of the invention is to provide a novel and practical separable and relatively adjustable combination with a conventional dental handpiece of means effective in manipulation therewith to directly and locally illuminate the operating environment of an instrument powered by the handpiece.

A further object of the invention is to provide a novel and improved attachment adapted for detachable association with conventional dental handpieces of diverse particularity and therewith adjustably effective to directly and locally illuminate the operating environment of an instrument powered by the associated handpiece.

A further object of the invention is to provide a novel and improved illuminating attachment adapted for operative, detachable, and relatively adjustable association with conventional dental handpieces of diverse particularity to directly and locally illuminate the operating environment of an instrument powered by the handpiece without occasion for the use of tools or any reworking of the handpiece.

A further object of the invention is to provide a novel and improved illuminating attachment adapted for unitarily-manipulable association with and to illuminate the operating environment of an instrument powered by a conventional dental handpiece without in any way impairing the availability and utility of the latter.

A further object of the invention is to provide a novel and improved construction and operative correlation of elements constituting a practical and efficient illuminating attachment for dental handpieces.

A further object of the invention is to provide a novel and improved illuminating attachment for dental handpieces that is convenient, facile, and advantageous of use, susceptible of expedient production from known and available components and materials in a range of desired sizes, conformations, and adaptations, and that is uniquely efficient in attainment of the ends for which designed.

With the foregoing and other objects in view, my invention consists in the construction, arrangement, and operative combination of elements as hereinafter set forth, pointed out in my claim, and illustrated by the accompanying drawing, in which—

FIGURE 1 is a side elevation of a practical embodiment of the invention as associated with a representative conventional dental handpiece in position of use.

FIGURE 2 is a side elevation of the attachment shown in FIGURE 1 apart from the associated handpiece in a separation of certain of its components.

FIGURE 3 is a longitudinal section, on a relatively-enlarged scale, through and substantially axially of the illuminating end portion of the improvement according to the preceding views.

FIGURE 4 is a longitudinal section, on the same scale as FIGURE 3, through and substantially axially of a slide coupling featuring the improvement remote from the illuminating end thereof and as operatively disposed in the arrangement according to FIGURE 1.

FIGURE 5 is a transverse section, on the same scale as FIGURES 3 and 4, taken substantially on the indicated line 5—5 of FIGURE 2.

The techniques and concomitant impediments incident to the use of conventional handpieces with their associated instruments are so widely known as to preclude occasion for elaboration herein. Consistent improvement in the design and construction of handpieces and instruments actuable thereby has much enlarged the utility and extended the practicality of such agencies, but a significant handicap, hitherto inadequately resolved, continues to be the difficulty of effectively illuminating the area in and upon which the instrument of a dental handpiece is operatively applied, and it is to the reformation of such difficulty with complete elimination of the handicap that the instant invention is directed.

In a wide diversity of particular forms, styles, and constructions, dental handpieces are alike characterized by a rigid, tubular, barrel portion serving as a grip for manipulation of the tool and housing powering agencies effective through a head at the operating end of the unit to rotate about its axis an instrument projecting outwardly from a seat in said head in reaction to power supply applied in any expedient manner to said powering agencies at or through the end of the unit remote from said head. Adaptable to use with any form or style of dental handpiece having the general organization above recited, the improvement of the invention is shown in a typical operative association with a representative, modern, conventional handpiece designed to be turbine-driven, the conventional such unit according to FIGURE 1 having the customary barrel portion 10, a head 11 fixed in a contra-angle disposition to one end of said barrel, a dental instrument 12 operatively disposed in and projecting from one end of said head, and fluid pressure and fluid supply lines 13 and 14, respectively, engaged through the end of the barrel 10 remote from the head 11 for the powering of turbine elements within the barrel in driving relation with the instrument 12 and for the spray delivery of coolant to the working end of said instrument, all in a usual and well-known operative combination in and of itself no part of the instant invention.

Typical of constructions appropriate to give effect to the principles of the invention, an organization suited for operative coaction with the illustrated handpiece is represented as a unitary assembly of elements characterized by a small-diameter tube 15 of substantially rigid material, such as metal. The tube 15 is provided in a length approximating that of the handpiece less the head 11 and is longitudinally conformed, as by bending, to closely and exteriorly parallel the handpiece in the plane including the axes of the barrel 10 and instrument 12 with that end of the tube adjacent the head 11 spaced slightly and inwardly of the barrel therefrom. At an intermediate zone of the length of the tube 15 opposed to a cylindrical reach of the barrel 10, a spring clip 16 of interrupted tubular form and stiffly-resilient, tempered material is symmetrically affixed to and tangentially of the tube, as by means of welding, in a diametric size adapted to closely embrance the barrel reach whereto it is opposed, a circumferential extent exceeding a half-circle, and an axial length preferably equal to, or greater than, its diameter. Permanently secured at the line bisecting its convex exterior surface to the tube 15 with its axis parallel to the length of the latter, the clip 16 is adapted for detachable coaction with an opposed reach of the barrel 10 in an obvious manner effective to mount said tube on the handpiece in the relationship shown and described and to retain the tube in such mounted association through a frictional engagement with the barrel accommodating selective adjustment of the clip and tube assembly both angularly about and longitudinally of the handpiece.

The end of the tube 15 spacedly-adjacent the handpiece head 11 is sized and internally threaded for mounting coaction with the externally-threaded base 17 of a conventionally-available electric light bulb having an illuminating component 18 coaxially integrated with the base 17 by means of an intermediate cylindrical body 19, whereby threaded interengagement of the base 17 and end of the tube 15 serves to attach the bulb unit to and as a coaxial, terminal extension of the latter with its illuminating component 18 exposed at the end of the resulting assembly closely and inwardly adjacent the handpiece head 11. The conventional bulb unit characterized by the elements 17, 18 and 19 is adapted for operative association with an electric circuit through the agency of a contact 20 centrally of the exposed end of the base 17 whence a lead within the bulb unit through the illuminating component 18 closes to exterior metallic elements of the unit, as at the base 17 or body 19, and a single-wire insulated conductor 21 housed within the tube 15 is appropriately stripped to expose a terminal length of its wire 21' for centered engagement through an insulating sleeve 22 press-fitted within the tube 15 inwardly adjacent the threaded end portion thereof and consequent registration of the end of said wire 21' with and in position to close for transmission of electrical energy against the contact 20 of the bulb unit when the latter is seated in its position of use. Selective direction of the light output from the energized illuminating component 18 is the function of a hood 23 of suitable opaque material, such as molded plastic, or the like, conformed to spacedly house the major portion of said component while exposing a restricted portion thereof radially and axially therethrough, a selectively-adjustable support for said hood in its position of use being provided by a tubular sleeve 24 integral and coaxial therewith at the open end thereof in a size adapted to telescope over and engage frictionally with the body 19 of the bulb unit.

The end of the tube 15 remote from the bulb unit is radially enlarged and worked to the form of a straight, tubular socket 25 adapted to house and retain, as by means of a flange inturned about its open end, a sleeve 26 of insulating material arranged to close and to project slightly from the otherwise open end of said socket through and by means of which a stripped end 21" of the conductor wire 21 is centered and exposed in a slight projection outwardly from the associated end closure of the tube.

The organization thus far described is a unitary assembly manually clip-engageable with and detachable from the barrel of a conventional handpiece as shown and described. Frictionally engaged by means of its clip 16 with the handpiece, as in FIGURE 1, the assembly is retained with the tube 15 substantially parallel to and exteriorly adjacent the barrel 10 in a non-interfering, simultaneously-manipulable relation with the handpiece, the illuminating component 18 is disposed in the angle between the instrument 12 and barrel 10 for selective adjustment with the assembly by virtue of its mounting on the barrel angularly about and axially of the latter, the hood 23 is retained on and moves with the associated end of the tube 15 as a facility selectively adjustable angularly and axially of the tube for regulation of the direction of light output from the component 18, and the socket 25 in fixed association with the tube 15 is directed along the handpiece and away from the head 11 thereof for separable connection with a source or supply of electrical energy conventionally available through a two-wire, insulated, flexible conductor 27 in a manner effective to energize the component 18 when the connection is closed.

Indicative of constructions appropriate to detachably couple the conductor 27 to and for energization of the component 18 of the attachment assembly shown and described, the arrangement according to FIGURE 4 has been found to be convenient and practical. A tubular metallic sleeve 28 of a size to snugly receive the socket 25 is provided in a length considerably exceeding that of said socket and is longitudinally split for a portion of its length, as at 28', to accommodate slight radial expansion and contraction of said portion adapting the same for secure frictional engagement with and about a corresponding length of the socket 25 telescopically entered therewithin. Adjacent the inner end of the split 28', an insulating block 29 is press-fitted and held within the solid tubular portion of the sleeve 28 to terminate a pocket opening through the end of the sleeve opposite to the split 28' adapted to receive and retain the end of the conductor 27 connectible with the attachment assembly. The block 29 is formed with a channel opening longitudinally therethrough and centrally of the block end directed toward the split 28' wherein is accommodated the stripped end 30 of one of the wires of the conductor 27 thereby disposed to register and end-engage with the end 21" of the conductor 21 when the socket 25 is entered to the limit of its travel inwardly of the split portion of the sleeve 28, and a second channel is formed in said block 29 to open radially thereof for the accommodation of the stripped end 31 of the other conductor wire therein and thereby directed to an energy-transmitting contact with the metallic wall of the sleeve 28. Thus, with the wires of the conductor 27 effectively connected with an appropriate source or supply of electrical energy, expediently through a control switch, not shown, and the socket 25 of the attachment assembly entered to the limit of its travel inwardly of the split portion of the sleeve 28, a circuit for supply of energy is completed to and through the illuminating component 18 on a path established by the wire 30 in contact with the end 21" of the wire 21, along the latter through the tube 15 and to and through the contact 20 of the bulb base 17, thence through the fixed circuit of the bulb including the illuminable filament thereof and to the metal exterior of the bulb unit in contact with the tube 15 through which latter in engagement at its socket 25 with the sleeve 28 connection is established with the end 31 of the other wire of the conductor 27.

Organized substantially as shown and described, the attachment unit assembly of the invention functions in the clip-mounted association with a conventional dental handpiece for which it is designed and when operatively coupled to a flexible conductor leading from an appropriate source or supply of electrical energy to generate light at the bulb component 18 with maximum intensity in a local field including and adjustable relative to the operating tip of a dental instrument powered by the handpiece, the direction and concentration of light output from said component being adjustably regulable through the agency of the hood 23 and frictional clip-mounting of the tube 15 to intensively illuminate the operating environment of the instrument in all functional applications of the latter with full accommodation of view by the handpiece manipulator.

Since changes, variations, and modifications in the form, construction, and arrangement of the elements shown and described may be had without departing from the spirit of my invention, I wish to be understood as being limited solely by the scope of the appended claim, rather than by any details of the illustrative showing and foregoing description.

I claim as my invention:

In combination, a contra-angle dental handpiece having a rigid barrel comprised from cylindrical sections progressively reduced in exterior diameter and a head at the end of said barrel section having the smallest exterior diameter operatively mounting an instrument radially of the adjacent barrel section powered through the barrel, a stiff tube of conductive material diametrically much smaller than any section of the barrel, said tube having a length slightly less than that of the barrel, a spring clip frictionally coacting with a barrel section of intermediate diameter fixed tangentially of and opening away from said tube between the ends thereof detachably engaging said barrel to adjustably attach said tube thereto with one end of the tube directed toward the instrument in the angle between the axes of said instrument and the associated barrel section, an internally-threaded seat in the end of said tube directed toward the instrument, an insulating sleeve fixed interiorly of said tube inwardly adjacent said seat, an insulated, single-wire conductor traversing said tube with a terminal length of its single wire engaged by and extending through said sleeve and having an end exposed centrally of said seat, a miniature electric bulb detachably retained in said seat in operative contact with the exposed end of the conductor wire, an open sided hood shrouding said bulb and detachably and adjustably mounted thereon, a radially-enlarged, end-opening, coaxial socket at and integral with the end of said tube remote from the bulb, an insulating sleeve fixedly closing the end of said socket in slight extension outwardly therefrom, a terminal length of the single wire of the conductor engaged by and extending through said latter sleeve and having an end exposed centrally of the extension thereof, a sleeve of conducting material telescopically coacting with and exteriorly engaging said socket, a plug of insulating material fixed interiorly of the sleeve of conducting material inwardly from an end thereof in opposition to the extension of the insulating sleeve closing the associated end socket of the tube, an insulated, two-wire conductor connectible with a source of supply of electric current terminally received in said sleeve of conducting material at the side of the plug remote from the associated socket, a terminal length of one of the two wires of said conductor engaged by and extending through and having an end exposed centrally of said plug in registered contact with the end of the conductor single wire positioned by the insulating sleeve of the associated socket, and a terminal length of the other of the two wires of the conductor received in the sleeve of conducting material conductively connected to the material of said latter sleeve.

References Cited in the file of this patent

UNITED STATES PATENTS

| | | |
|---|---|---|
| 2,226,616 | Kraus | Dec. 31, 1940 |
| 2,588,288 | Pohanka | Mar. 4, 1952 |
| 2,745,949 | Borin | May 15, 1956 |
| 2,809,283 | Spencer | Oct. 8, 1957 |

FOREIGN PATENTS

| | | |
|---|---|---|
| 1,050,694 | France | Sept. 2, 1953 |